US011893561B2

(12) United States Patent
Orr et al.

(10) Patent No.: US 11,893,561 B2
(45) Date of Patent: *Feb. 6, 2024

(54) SYSTEM FOR INTERFACING A CLIENT DEVICE WITH A POINT OF SALE SYSTEM

(71) Applicant: ATX Innovation, Inc., Austin, TX (US)

(72) Inventors: Rick N. Orr, Austin, TX (US); David Lemley, Cedar Park, TX (US); Cameron J. Hotchkies, Austin, TX (US); Jean-Louis Dehoux, Austin, TX (US)

(73) Assignee: ATX INNOVATIONS INC, Austin, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 16/858,651

(22) Filed: Apr. 26, 2020

(65) Prior Publication Data

US 2020/0402034 A1    Dec. 24, 2020

Related U.S. Application Data

(63) Continuation of application No. 14/878,839, filed on Oct. 8, 2015, now abandoned, which is a continuation (Continued)

(51) Int. Cl.
*G06Q 20/00* (2012.01)
*G06Q 20/20* (2012.01)
(Continued)

(52) U.S. Cl.
CPC .......... *G06Q 20/202* (2013.01); *G06Q 20/14* (2013.01); *G06Q 20/204* (2013.01);
(Continued)

(58) Field of Classification Search
CPC .... G06Q 20/202; G06Q 20/14; G06Q 20/204; G06Q 20/322; G06Q 20/3226; G06Q 20/401
(Continued)

(56) References Cited

U.S. PATENT DOCUMENTS 7,130,807 B1 *  10/2006  Mikurak ............ G06Q 30/0202
                                                      705/7.31
8,032,409 B1 *  10/2011  Mikurak ................ G06Q 30/00
                                                      705/14.39
(Continued)

FOREIGN PATENT DOCUMENTS

CA       2962648 A1 *   4/2007  ........... G06F 21/606
KR    2000068758 A  *  11/2000  ............. G06Q 20/04
(Continued)

*Primary Examiner* — Russell S Glass

(57) ABSTRACT

An information technology system taking the form of a management console, central server, point of sale system, software running on a point of sale system and software running on a customer's mobile phone. The software on the customer's mobile phone lets a customer interact with the point of sale system, allowing the customer to view a pending economic transaction, optionally add or remove items to the transaction, and pay for the transaction using payment information stored on the mobile phone.

20 Claims, 4 Drawing Sheets

Related U.S. Application Data of application No. 13/020,795, filed on Feb. 3, 2011, now Pat. No. 9,195,982.

(60) Provisional application No. 61/301,335, filed on Feb. 4, 2010.

(51) Int. Cl.
*G06Q 20/32* (2012.01)
*G06Q 20/14* (2012.01)
*G06Q 20/40* (2012.01)

(52) U.S. Cl.
CPC ....... *G06Q 20/322* (2013.01); *G06Q 20/3226* (2013.01); *G06Q 20/401* (2013.01)

(58) Field of Classification Search
USPC .................................................. 705/15, 16
See application file for complete search history.

(56) References Cited

U.S. PATENT DOCUMENTS

| | | | |
|---|---|---|---|
| 11,068,890 B2 * | 7/2021 | Bacastow | G06Q 20/4012 |
| 2009/0159705 A1 | 6/2009 | Mullen et al. | |
| 2009/0281904 A1 | 11/2009 | Pharris | |

FOREIGN PATENT DOCUMENTS

| | | | | |
|---|---|---|---|---|
| WO | WO-0229738 A2 * | 4/2002 | ............. | G06Q 20/04 |
| WO | WO-2009082748 A1 * | 7/2009 | ............. | G06Q 20/20 |

* cited by examiner

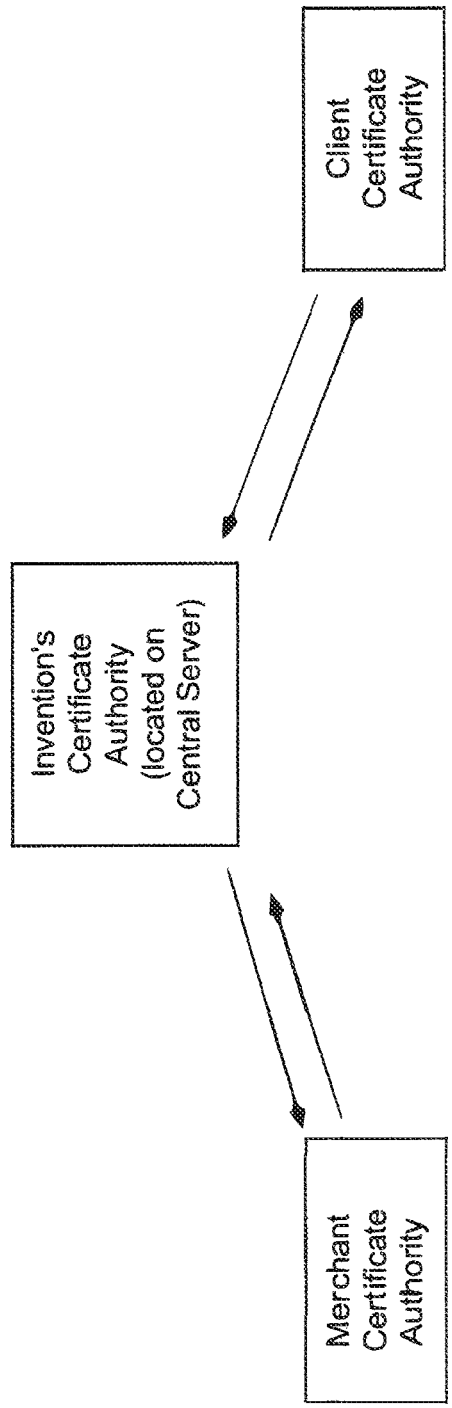

US 11,893,561 B2

SYSTEM FOR INTERFACING A CLIENT DEVICE WITH A POINT OF SALE SYSTEM

CROSS REFERENCE TO RELATED APPLICATIONS

This nonprovisional patent application is a continuation of U.S. patent application Ser. No. 14/878,839, filed 8 Oct. 2015, which is a continuation of U.S. patent application Ser. No. 13/020,795, filed on 3 Feb. 2011, now U.S. Pat. No. 9,195,982, which claims benefit of U.S. Provisional Application No. 61/301,335, filed 4 Feb. 2010, each of which is herein incorporated by reference.

STATEMENT REGARDING FEDERALLY SPONSORED RESEARCH AND DEVELOPMENT

No Federally sponsored research or development was requested for, accepted, or used in the development related to the invention herein claimed.

BACKGROUND OF THE INVENTION

Point of Sale (POS) systems are systems that allow merchants to process purchases made by their customers at the "point of sale," which is the area in the merchant's establishment where the transaction comprising the exchange of value for goods or services takes place. The POS system may be as antiquated as a mechanical cash register or as complex as a fixed piece of computer hardware with components such as a cash drawer, touch screen and credit card swipe mechanism. From a customer's perspective, the merchant "rings up" the transaction at the POS system by recording the items which the customer purchases, calculates any sales tax due, presents a receipt to the customer, and receives payment from the customer.

The layout of merchant establishments may be burdensome on the customer if the customer is forced to locate the point of sale and then must be physically present at the point of sale. One example of a burdensome merchant layout is that of a hotel; when the customer is ready to check out, he/she traditionally must walk to the "front desk" of the hotel (which is essentially the "point of sale") to pay his/her final bill. Newer POS systems in hotels allow customers to check-in at the front desk, but allow the customers to check-out by simply leaving their rooms on the check-out date without returning to the front desk. In this situation the POS system captures the customers' credit or debit card information at the time of check-in and processes the final bill prior to the designated check-out time. A printed copy of the final bill is usually delivered to the customer's room prior to the check-out time and an electronic copy of the final bill may be delivered to the customer's email account.

Other merchant establishments would benefit from a more "flexible" POS system that allows customers to pay for good/services at points other than the merchant's "fixed" point of sale. One type of merchant establishment that could benefit from a flexible POS system is the restaurant and bar industry. Restaurants and bars generally have fixed points of sale, such as POS systems located around a bar or a POS system located at the venue's entrance, and customers must either locate themselves at the POS system or provide their payment means to the venue's staff so that they may process the payment transaction at the POS system. This payment process in restaurants and bars is inefficient, causes customers to linger in the venue for periods of time and also forces the venue's staff to spend time processing payments instead of attending to other customers' needs.

BRIEF SUMMARY OF THE INVENTION

The invention is an information technology system that allows a customer's mobile communications device (the customer's "smartphone") to interface with a merchant's POS system, thereby allowing the customer to complete the payment step of a merchant/customer transaction from the customer's mobile communications device. Providers of POS systems may incorporate the invention directly into their POS systems and operate the invention themselves. The invention may also be operated by a third party distinct from the POS system provider; in this situation, the third party may need to provide "integration library" software to merchants so that their POS system will properly communicate with the third party's information technology system. Furthermore, different means may be used to allow the customer's mobile communications device to communicate with the merchant's POS system, such as through 3G or 4G mobile communications, through wi-fi, through wi-max, through Bluetooth, and through near-field communications (NFC) protocols.

The invention may be implemented in a bar environment so that patrons may pay for their tabs, or "close out" their tabs, by pressing a "Pay" button displayed on the graphic user interface (GUI) of the mobile communications device or executing a "Pay" command on their mobile communications device. Either action would remit the user's credit/debit card information to the merchant's POS system, thereby paying the outstanding bill, after which the customer may leave the establishment.

BRIEF DESCRIPTION OF THE DRAWING

Referring now to the drawing, in which like reference numbers refer to like elements throughout the various figures that comprise the drawing. Included in the drawing are the following figures:

FIG. 4 is is a diagram of the encryption means used by the invention.

Figure 1:
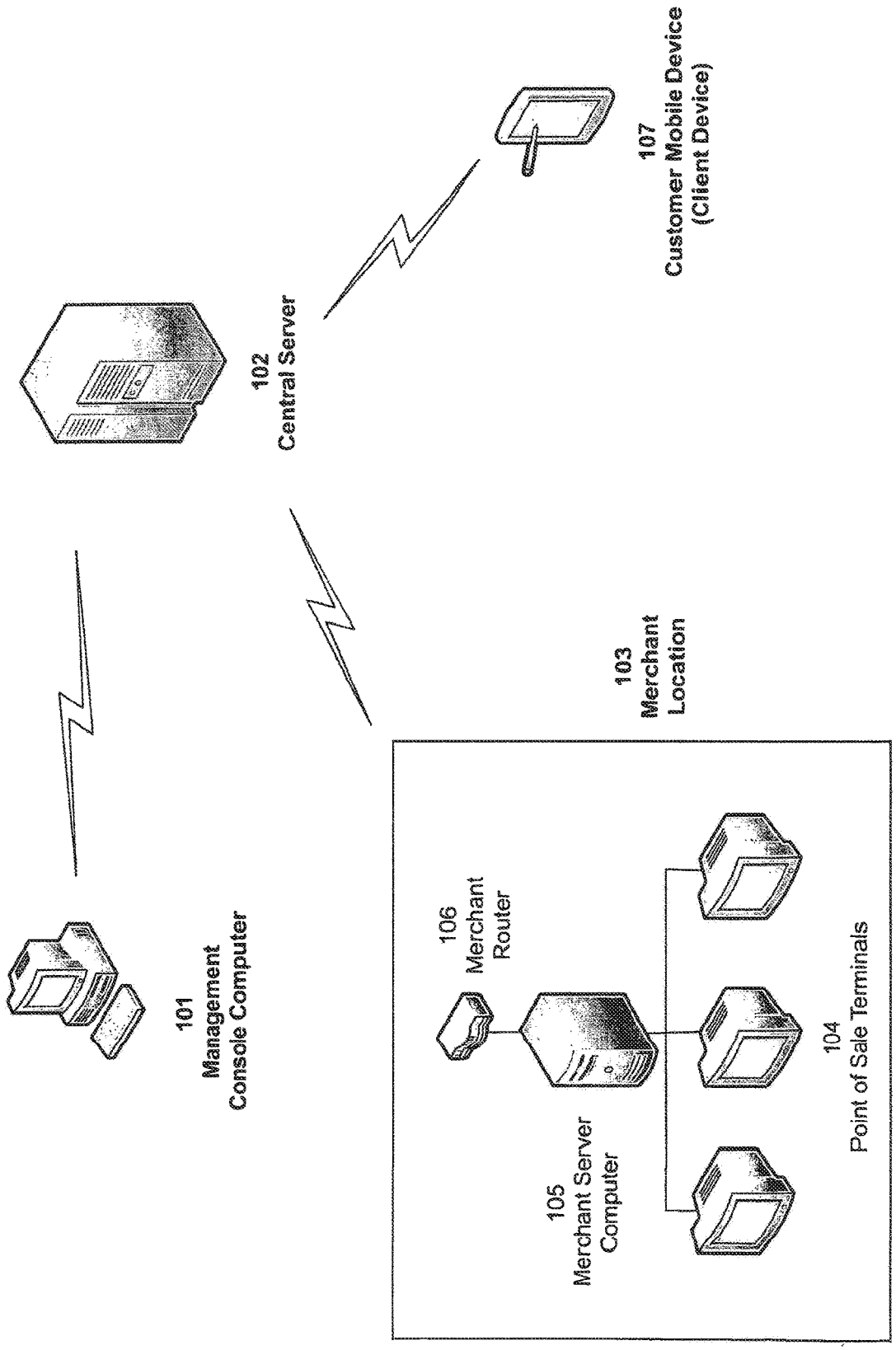
FIG. 1 is a diagram of the information technology components required by the invention.

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity.

DETAILED DESCRIPTION OF THE INVENTION

The invention is an information technology system that allows a customer's mobile communications device, referred to as a "client device," to interface with a merchant's POS system. The customer's mobile communications device will include a client software application, which is the component of the invention resident on the client device, that performs the interaction with the POS system.

The invention allows a customer to use his/her mobile communications device to review the items that he/she has purchased, add an optional gratuity to the transaction, optionally add/remove or order items to the transaction through an order mechanism, and to pay for the final bill using a "Pay" command button on the mobile communications device. The customer's payment information is stored by the client software application on the mobile communications device and remitted to the POS system upon the execution of this command. The payment information will generally take the form of the customer's credit or debit card information. After the client software receives notification that the POS system has processed the transaction, the customer may leave the establishment In one mode of implementation, the company that developed the merchant's POS system may incorporate the invention directly into the operation of their POS system and operate the invention itself. In another mode of implementation, which would be the preferred mode of implementation, the invention may also be operated by a third party distinct from the POS system provider; in this situation, the third party may need to provide "integration library" software to merchants so that their POS system will properly communicate with the third party's information technology system.

The invention may be implemented in a bar environment so that patrons may pay for their tabs, or "close out" their tabs, by pressing a "Pay" button displayed on the client software application to executing a "pay" command through the mobile communications device. This action remits the user's credit/debit card information to the merchant's POS system, thereby paying the outstanding bill, after which the customer may leave the establishment.

Implementing the invention in the described example of a bar environment would allow a customer the freedom to control when he/she closes his tab. Extending the payment operation to the customer provides a benefit to the bar's operator since the payment from the client device allows the customer's transaction to conclude faster since the customer's server will not need to make several trips between the customer and the POS system in order to present the final bill, accept the payment means, process the payment at the POS, provide a final bill to the customer, and collect the gratuity and bill upon the customer's departure. Furthermore, the invention provides an additional level of security to the customer's payment transaction since the customer's credit or debit card information will not pass through a human intermediary, thereby eliminating the risk of a "waiter attack" in which the server appropriates the customer's credit/debit card information from the physical card.

Two different "process flows" are envisioned for the present invention. The first, called the "restaurant process flow," requires the POS system to generate print a payment code on the customer's receipt, which is delivered to the customer by the venue's staff. The customer then enters the payment code into the client software application. The client software application will interface with the POS system and transmit the purchase code, after which the POS system will match the purchase code to the "bill," or the order record associated with the purchase code, in its memory system. The POS system will then deliver a list the items that the customer has ordered to the client software application. The client software application will then let the client view the final bill, allow the customer to enter an option gratuity, and then let the customer pay the final amount by executing the "pay" command.

The second, which is the preferred embodiment, is called the "bar process flow." The bar process flow begins when the customer launches the client software application and clicks an "open a tab" or "open an order" command. The client software application then delivers an "open a tab" command to the software operating on the POS system, which then generates a "purchase code" that is displayed on the POS system and delivered to the client device. The client software application then displays the purchase code to the customer, who will present the code to an employee of the merchant location. The employee then matches the purchase code on the client device with the same purchase code on the POS system and enters the items ordered by the customer into the POS system. The POS system creates a "bill" for each customer and this bill is associated with the purchase code. The bill will have a listing of each ordered item and the total amount due to merchant. The customer may use the client software application to interface with the POS system to view this bill while the customer is enjoying himself in the merchant establishment. When the customer is ready to pay, he simply presses the "pay" button on the client software application. The client software application then remits the payment information to the POS system, which processes the payment transaction and then delivers a payment receipt to the customer.

As the names indicate, the "restaurant process flow" would be applicable to restaurants using the invention while bars using the invention would prefer the "bar process flow" implementation of the invention. Although the present example and nomenclature of the process flows describe the invention as used in a bar or restaurant setting, the invention may be implemented in any retail setting in which a customer is required to provide payment means to a POS system. Variations of either the "restaurant process flow" or "bar process flow" could be implemented in various retail settings depending upon the preference of the retailer.

Components of the Invention

There are two models of the invention's system. The preferred embodiment of the invention is the "Central Server" model set forth in FIG. 1. The "Central Server" model, however, can be transformed into a "Local Server" model by moving the central server's functional components onto a proprietary Local Server hardware device which will provide the same functions as the Central Server.

FIG. 1 is a diagram of the information technology components of the invention. The invention requires a management console computer (101) that interfaces with a central server (102). The management console computer allows the operator of the invention to interface with the central server and execute the relevant commands. The central server will retain information related to merchants who have "enrolled" in the system, or merchants who have opted to use the system and installed merchant side software application on their POS system. The merchant location (103) is the physical location operated by a merchant and includes point of sale terminals (104), optionally a merchant server computer (105) and a merchant router (106) (note that 104 and the option 105, in the aggregate, constitute the POS system). The merchant router (106) may be replaced by other means that allow the point of sale terminals (104) and merchant server computer (105) to access the Internet. The customer mobile device (107), or the client device, is the customer's smartphone or other mobile communications device and will run the client software application.

During the operation of the invention, the customer mobile device (107) will communicate with the central server (102) which will communicate with the POS terminals (104) and merchant server computer (105) located at the merchant's location (103). All communications are made over an end-to-end encrypted channel. This channel may be established using an ephemeral key negotiated on a per-transaction basis, directly and solely between the customer and merchant endpoints. During channel establishment, the communicating parties are authenticated via electronic security certificates issued by the operator of the central server (102) in order to establish identity and authorization to perform the intended action; the certificates also bear extensions indicating their respective roles and allowed capabilities.

FIG. 1 presents the hardware used to the software components of the system: the client software application (which operates on the client device (107)), the merchant side software application (which operates on either the merchant server computer (105) or the POS terminals (104)), and the central server software (which operates on the central server (102)).

Client Software Application

A customer may obtain the client software application from "app" distribution channels such as the iTunes App Store or the Android Marketplace. The client software application allows the customer to use his/her mobile device (107) to communicate with the merchant's point of sale system (104, 105) through the central server (102). The minimum functionality of the client software application is to provide a user interface, communicate with the central server (102), and to securely store the customer's encrypted credit or debit card information (or other payment information). Other functionality can be added to the client software application, such as the ability to order from menus stored by merchants on their POS systems (104, 105) and communicated to the customer's mobile device (107) via the central server (102). The client software application requires no special registration or enrollment, although in an optional embodiment of the invention, the customer may be required to enroll the client device (107) with the central server (102) to receive a client certificate for authentication of the client device.

The client software application comprises: (1) a graphic user interface which the customer will operate, (2) an Application Program Interface component which communicates with the central server (102), (3) a "wallet" component for encrypting and storing the customer's encrypted credit/debit card information (the "wallet" may store the encrypted information for more than one payment card), (4) a client software application private key generated under the Rivest, Shamir and Adleman (RSA) algorithm, (5) encryption software used to generate a to verify the possession of a private key held by the client side software application, and (6) a "geolocation" component which will display the location of nearby merchants who are enrolled in the system by using the location services features of the customer's mobile device (107).

Merchant Side Software

The merchant side software application is installed on the merchant POS system (104, 105) and acts as the gateway between the merchant's POS system and the central server (102). The merchant side software application will have the ability to directly communicate with the native pre-installed software already running on the merchant's POS system; this native pre-installed software will have already been developed or installed by the developer of the merchant's POS system and performs all of the standard functions of the merchant's POS system. The merchant side software application comprises the following: (1) an integration Application Program Interface, which provides the functionality needed to communicate with the central server, authenticates the merchant's POS system, and encrypts the communications to the central server, (2) a merchant side software application private key generated under RSA, (3) software to generate a signature to establish possession of a private key held by the merchant side software, and (4) software for the POS system specific integration, which is code required for the interface with the native pre-installed software. The merchant POS system must "sign on" to the central server to indicate it is ready to participate in a transaction managed by the invention. The merchant POS system will identify itself using a certificate issued from the central server's infrastructure at the time the merchant was enrolled with the central server.

Central Server Software

The central server (102) provides an Internet-accessible point between merchants and customers. It comprises the following: (1) optional graphic user interface (GUI) components and a message routing daemon. The optional GUI components include graphic components for the buttons and graphic elements that appear in the client software application. These components may be delivered by the central server software to the client software application to enable a "customized look and feel" or a merchant-specific branded appearance for the client software application. The message routing daemon provides a central means by which the customer, merchant and operator of the invention can communicate with each other. This component forwards messages delivered via connected sessions for all communicating participants. Communication sessions between the central server (102) and the client device (107) are expected to be short-lived (typically for the duration of a transaction), while communications sessions between the merchant POS system (104, 105) and the central server (102) are intended to be long-lived (as long as the system is up and ready to process transactions). No cryptographic operations are performed by this component, and various details of the invention's design preclude an adversary's doing so in order to facilitate, for example, a man-in-the-middle attack.

Merchant "Onboarding"

Figure 2:
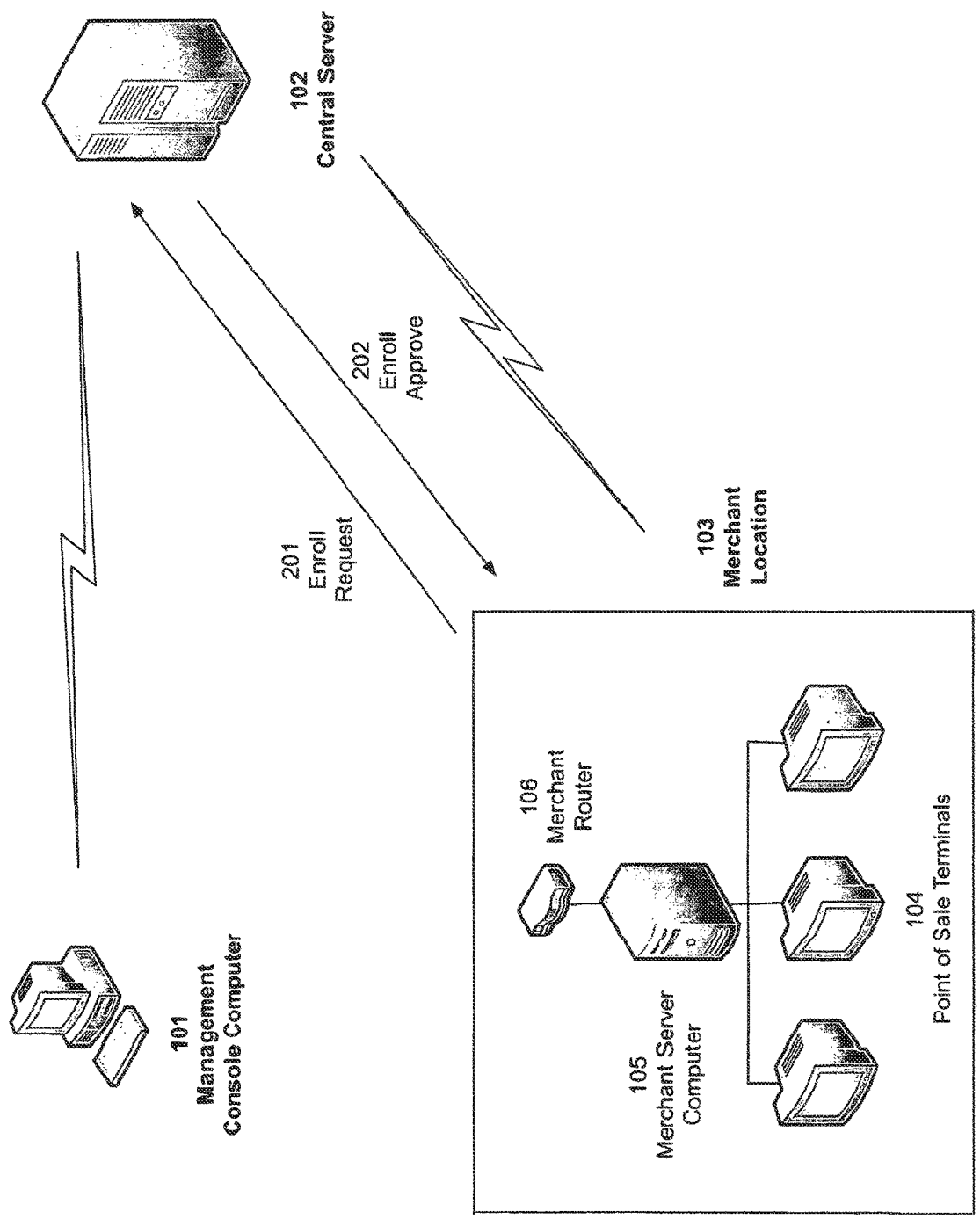
FIG. 2 is a diagram of the steps required to "onboard" a merchant location in the system so that the merchant may provide its customers access to the invention.

In a preferred mode of the invention, merchants desiring to use the invention at their locations will go through an "onboarding" process as depicted on FIG. 2. At the conclusion of this process, the merchant will be enrolled with the central server software and will be able to use the invention. The invention has been designed to minimize the number of steps and the effort required to onboard a merchant; the merchant need only install the merchant side software application on their POS systems and register (or "enroll") with the central server (102).

Successful completion of the onboarding process will cause the central server (102) to issue an electronic security certificate to the merchant (202) that allows them to participate in the system. The merchant's private encryption key is generated when the merchant side software application is installed on the merchant's POS system at the merchant's location (103). Merchant authentication proceeds by checking a signature generated by the merchant side software application (to establish possession of the private key), the endpoint identity as recorded in the certificate (to ensure communications with the intended endpoint), and the indicated role (to establish authorization to perform the particular action attempted). Anonymous merchant operations are explicitly forbidden.

The onboarding procedure begins when the merchant obtains the merchant side software, which can take the form of an installer application to facilitate the proper installation of the software. The merchant side software application may be freely distributed and made available through the Internet. The onboarding procedure may be as follows: (1) the merchant installs the merchant side software application on the merchant POS system (104, 105); (2) the merchant side software application determines which POS system the merchant uses; (3) if required, the merchant side software application downloads updated software from the central server; and (4) the merchant side software application asks for the physical location of the merchant, and optionally determines the merchant's internet protocol address, submitting both to the central server so that this location information may be used by the client software application during transactions.

During the onboarding procedure, the merchant side software application will perform the following: (1) a connectivity test to the central server (102) (201); (2) collection of the merchant's name, address, contact information and location information; (3) submission of an enrollment request to the central server, which will cause issuance of a security certificate (201), and generation of the signature; and (4) a final approval of the merchant's enrollment request, which may be performed through a manual verification of the merchant (such as by a phone call to the merchant and verification of the merchant's address) and the issuance of a unique merchant identifier (202).

Merchant POS System Sign-On

During normal operation after the initial deployment, the merchant POS system (104, 105) establishes a session with the central server (102). This session is persistent and all client communications are multiplexed over it. The session is initiated via a "sign-on." Sign-on consists of presenting configuration information to the central server including: (1) the unique merchant identifier; (2) the merchant name, which will be delivered to the client device (107) and presented to the customer via the graphic user interface; (3) the signature generated by the merchant side software application and certificate issued by the central server for identification of the merchant POS system; and optionally (4) an internet-facing Internet protocol address.

At sign-on, the central server (102) verifies the information submitted by the merchant POS system (104, 105). If the sign-on is accepted, the central server registers the merchant as being online, and available for transaction processing. The merchant signs-off by terminating the connection for the session.

Closing a Tab or Transaction; Purchasing of Items by Client

Figure 3:
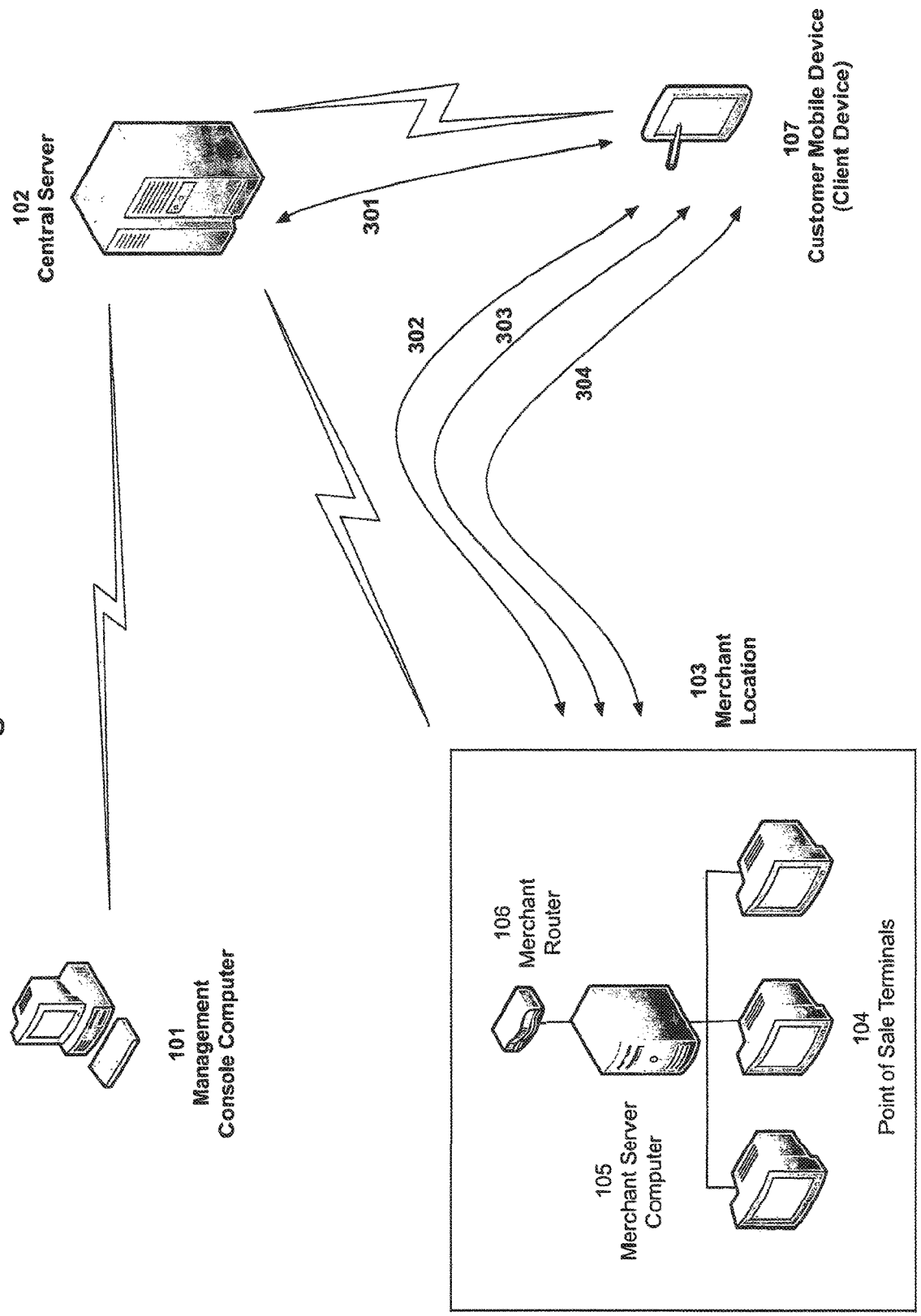
FIG. 3 is a diagram of the steps performed by the information technology components when a customer uses the invention to pay for an item.

FIG. 3 depicts the steps involved when a customer chooses to close an open tab (such as a tab opened at a bar), to pay for a transaction or pay for an item. FIG. 3 presents the steps involved in the "bar process flow" as described previously. The payment transaction requires client authentication of the recipient of the payment, and the negotiation of a session key to encrypt the data.

As set forth on FIG. 3, the following steps are performed:

First, the customer launches the client software application on the client device (107). The client device then queries (301) the central server (102) and updates the client device so that it may display the list of available merchants. The client software application may use the client device's location services to sort the list of available merchants according to their distance from the client device, or the customer may use a "search" function to locate nearby merchant locations.

After locating and entering the applicable merchant location, the customer will use the "open a tab" function in the client software application to start a session in which the customer can add items to his/her bill and optionally order items from the client software application. After the customer presses the appropriate button to "open" the tab, the client software application establishes a session (302) with the merchant side software application running on the merchant POS system (104, 105).

During this session (302), the client software application and merchant side software application authenticate their RSA keys through Diffie-Hellman-Merkle key exchange. The client software application will provide a signature and certificate to the merchant side software application to authenticate the client device running the client software application. A session identifier (which identifies if the session is valid) and transaction identifier (which identifies the specific transaction the customer is entering into) are also created by the merchant side software application and communicated to the client software application. If both the client software application and the merchant side software application accept the response from each other, the session has been negotiated and further communications between the client device (107) and merchant POS system (104, 105) will be accepted.

The customer's tab is now considered open and the client software application will send the encrypted debit or credit card information stored on the client device (102) to the merchant's POS system (104, 105). The merchant side software application then decrypts the encrypted debit or credit card information and optionally pre-authorizes or verifies the customer's debit or credit card.

Upon receipt of the debit/credit card information, the merchant side software application requests an "Open Tab Reservation" (OTR) from the native pre-installed software running on the merchant's POS system (104, 105). The OTR creates a "bill" on the merchant's POS system so that the merchant's employee may add items to the bill. The OTR causes the merchant side software application to generate an alpha-numeric code which is then delivered in an encrypted format to the requesting client device (303). This code is displayed on the customer's client device and may optionally the first and last name associated with the customer's debit/credit card. The OTR simultaneously causes the merchant's POS system to display the same alpha-numeric code on the display of the merchant's POS system (104, 105) and may optionally the first and last name associated with the customer's debit/credit card.

The customer then shows the code on the client device (107) to the merchant's employee, who verifies that the same code is displayed on the merchant's POS system (104, 105). If the same code appears on both the client device (107) and the merchant's POS system (104, 105), the merchant's employee knows that the customer's tab is "open." The employee will also know that the customer's credit/debit card was successfully pre-authorized or verified if this optional verification has been included in the implementation of the invention. The customer may now order items and the merchant's employee will record the ordered items on the customer's bill on the merchant's POS system.

With the tab now open, the customer is able to use the client software application to view the items added to his/her bill along with the subtotal cost, tax and proposed gratuity (if any). The customer may query the merchant's POS system (104, 105) using the functions of the client software application. This will cause the merchant side software application to deliver real-time information to the client device (303) as the merchant's employee updates the customer's tab.

When the customer is ready to pay the bill (or to "close out" the tab), the customer will open the client software application, which will again query (303) the merchant side software application and merchant's POS system (104, 105). The subtotal cost, tax and proposed gratuity will be delivered to the client software application. The customer can modify the gratuity amount with the client software application and then use the "pay" functionality of the client software application to submit final payment for the bill (304). The "pay" command will include the session identifier and the transaction identifier as well as the total amount that the customer is to pay. After the customer has submitted the payment request, the merchant side software application will process the payment of the transaction through the existing merchant account used by the merchant's POS system (104, 105). This step illustrates another strength of the invention; since the merchant's existing merchant account is used to process the payment, the invention's transaction is equivalent to a typical "credit/debit card swipe" performed by an employee on the card swipe mechanism of the merchant's POS system.

The merchant side software application will then deliver to the client software application an approval/denial message (304), which is then presented to the customer. If the payment is accepted, the customer will have the ability to receive an emailed receipt of the transaction that will include an itemized list of the products placed on the customer's bill. If the payment is denied, the customer will have the opportunity to pay his/her bill with alternative means, such as cash. The approval/denial message will also include the transaction identifier and session identifier as well as a command to close the session.

In the "restaurant process flow" implementation, instead of the alphanumeric code presented on the client device, a tab code may be printed on the receipt given to the customer. In this implementation, the customer would input the tab code into the client software application and hit the "pay" button. The payment information would be delivered to the merchant side software, at which point the merchant side software application and merchant POS system would associate the tab code with an outstanding bill and then use the customer's stored debit/credit card information to pay the outstanding bill.

Encryption Used by the Invention

Encryption is used to protect customer information. Distinct certificates are created and provisioned to the various parties involved in a transaction and all communications exchanged between parties are signed to assure that the intended party originated them. As depicted on FIG. 5, negotiation of encryption keys and authentication of the merchant POS system (104, 105) and the client device (107) occurs between the merchant POS system (104, 105) and the client device (107) only. There is no intermediary party that holds the encryption keys, meaning that the customer data is available in plaintext only to the merchant POS system (104, 105) and the client device (107) that originates the transaction. The central server acts only as an "intermediary" of the information, or as a de facto "router" of the information and does not perform any decryption or encryption function (although it does act as a certificate authority when enrolling merchant POS systems). In this manner, a compromise of the central server will only disrupt the functionality of the invention's system but will not compromise the sensitive customer information because this information is stored in an encrypted format only on the client device (107). Additionally, the process of negotiating session keys for encryption can only be done between the merchant POS system and the client device, so a compromise of the central server should not make easy a spoofing attack whereby the central server masquerades as a POS system to "trick" the client into divulging payment data. The certificates issued by the central server are further issued with private identifiers to differentiate the roles played by the various parties to the transaction. Parties will refuse to negotiate a session key with a party that cannot both prove its identity and also prove its intended role. In this manner, if a person compromised the central server and obtained a private key, it could not masquerade as a merchant and coax a client device to negotiate a session key to convey payment information.

A person skilled in the arts of computer programming, information technology system architectures, information technology system design, and electronic communications technologies may use this written description and the Figures to build a system implementing the invention.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges that fall within the broader ranges.

We claim:

1. A method for facilitating a transaction between a venue and a user of a wireless mobile communications device, the method comprising:
receiving encrypted payment information associated with the user of the wireless mobile communications device from a client application implemented by the wireless mobile communications device, via a wireless communication network, at a point of sale system associated with the venue offering a good or a service for sale by the venue, the venue being a bar or restaurant, the encrypted payment information including a credit or debit card number;
receiving at the point of sale system from the client application via the wireless communication network an alphanumeric code for locating the user within the venue and corresponding to the transaction between the venue that utilizes the point of sale system and the user of the wireless mobile communications device;
providing to the client application implemented by the wireless mobile communications device a bill associated with the transaction, wherein the transaction includes a compensation amount for the good or the service; and
receiving a payment request for the transaction associated with the alphanumeric code from the client application implemented by the wireless mobile communications device, via the wireless communication network, at the point of sale system; and
processing the payment request at the point of sale system using the payment information associated with the user of the wireless mobile communications device.

2. The method of claim 1, further comprising providing the alphanumeric code to the customer for the customer to enter into the client application.

3. The method of claim 2, wherein providing the alphanumeric code includes providing a receipt with the alphanumeric code to the customer.

4. The method of claim 1, wherein the bill includes a list of items.

5. The method of claim 1, further comprising providing to the client application on the wireless mobile communication device a set of venues including the venue.

6. The method of claim 5, wherein providing the set of venues to the client application is performed by a central server.

7. The method of claim 5, further comprising determining the set of venues based on a location of the wireless mobile communication device.

8. The method of claim 7, further comprising receiving a selection of the venue from the set of venues from the client application through the wireless communication network.

9. The method of claim 8, further comprising initiating communication between the point of sale system associated with the venue and the client application in response to receiving the selection of the venue.

10. The method of claim 9, wherein initiating communication between the point of sale system associated with the venue includes negotiating an encryption key between the client application and merchant side software associated with the point of sale system associated with the venue.

11. The method of claim 1, further comprising receiving a selection of an item at the point of sale system associated with the venue from the client application via the wireless communication network.

12. The method of claim 8, further comprising adding the item to the transaction associated with the alphanumeric code at the point of sale system.

13. The method of claim 1, wherein the client application has access to a wallet component storing credit card information.

14. The method of claim 13, wherein receiving the encrypted payment information includes accessing the wallet component to receive payment information including the credit card information.

15. The method of claim 1, further comprising providing the client application in an application marketplace for the client to download to the wireless mobile communication device.

16. A method for facilitating a transaction between a select venue and a user of a wireless mobile communication device, the method comprising:
  providing from a central server to a client application implemented on the wireless mobile communication device associated with the user a set of venues that offer goods or services, the venue being a bar or restaurant;
  receiving a selection of the select venue of the set of venues from the client application through the wireless communication network;
  initiating with the central server communication between a point of sale system associated with the select venue and the client application in response to receiving the selection of the select venue, wherein initiating communication between the point of sale system associated with the select venue includes negotiating an encryption key between the client application and merchant side software associated with the point of sale system associated with the select venue;
  receiving at the point of sale system from the client application via the wireless communication network an alphanumeric code for locating the user within the select venue and corresponding to the transaction between the select venue that utilizes the point of sale system and the user of the wireless mobile communications device;
  providing to the client application implemented by the wireless mobile communications device a bill associated with the transaction, wherein the transaction includes a compensation amount for the good or the service;
  receiving encrypted payment information associated with the user of the wireless mobile communications device from the client application implemented by the wireless mobile communications device, via a wireless communication network, at the point of sale system associated with the select venue, the encrypted payment information including a credit or debit card number;
  receiving a payment request for the transaction associated with the alphanumeric code from the client application implemented by the wireless mobile communications device, via the wireless communication network, at the point of sale system; and
  processing the payment request at the point of sale system using the payment information associated with the user of the wireless mobile communications device.

17. The method of claim 16, further comprising providing the alphanumeric code to the customer for the customer to enter into the client application.

18. The method of claim 16, further comprising:
  receiving from the client application a location of the wireless mobile communication device; and
  determining the set of venues based on the location of the wireless mobile communication device.

19. The method of claim 16, further comprising:
  receiving a selection of an item at the point of sale system associated with the venue from the client application via the wireless communication network; and
  adding the item to the transaction associated with the alphanumeric code at the point of sale system.

20. The method of claim 16, wherein the client application has access to a wallet component storing credit card information, wherein receiving the encrypted payment information includes accessing the wallet component to receive payment information including the credit card information.

* * * * *